F. BUSHEY.
NUT LOCK.
APPLICATION FILED MAY 25, 1909.
951,414.
Patented Mar. 8, 1910.
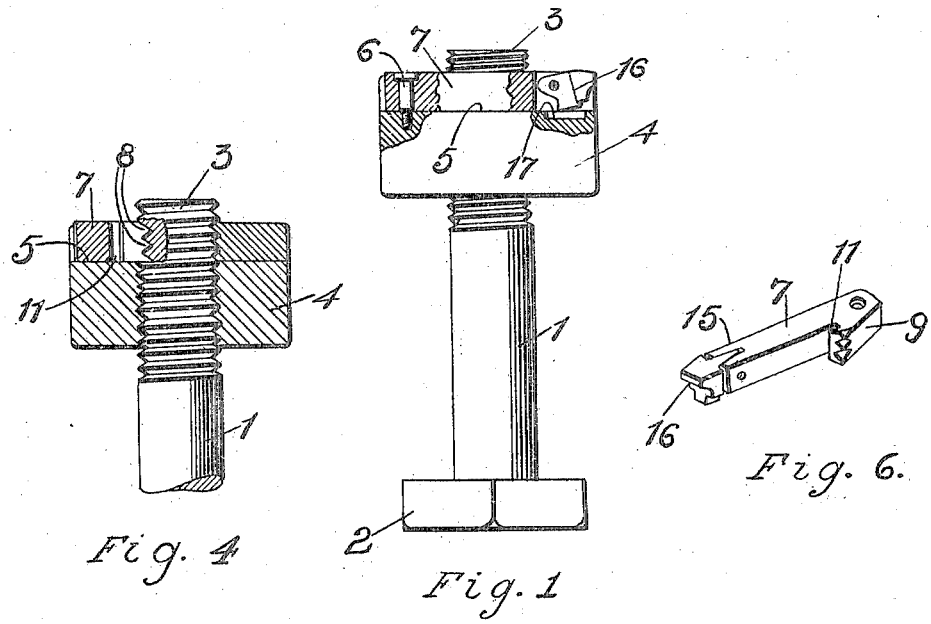
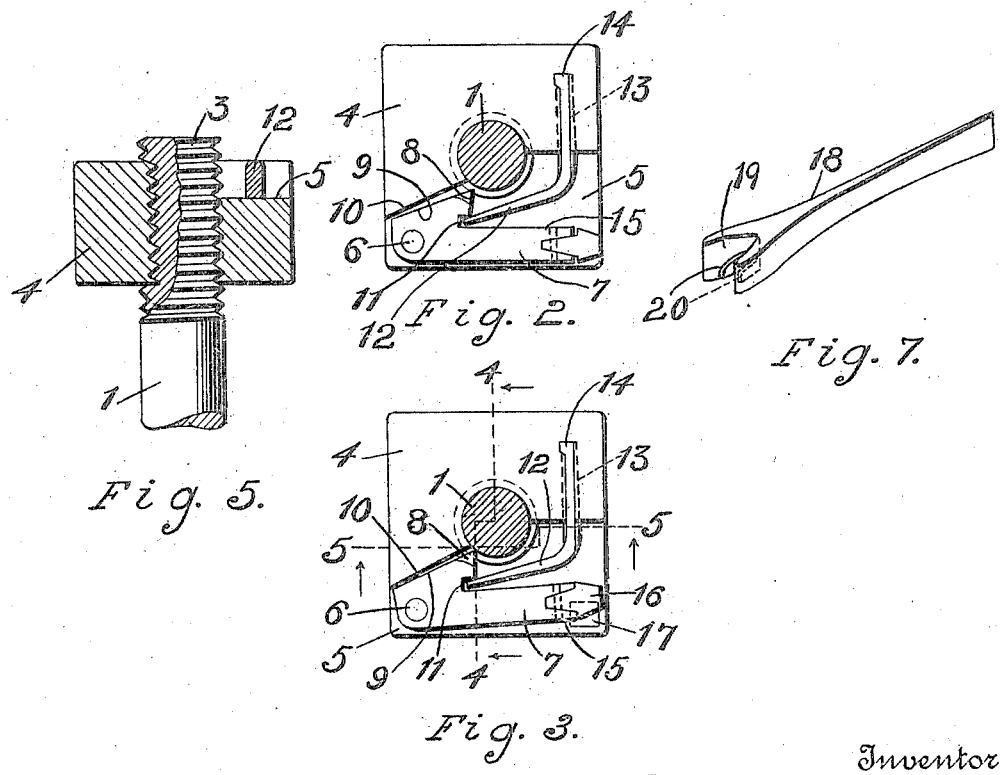
Witnesses
G. K. Dunstan
C. H. Griesbauer
Inventor
Frank Bushey.
by H. B. Willson & Co.
Attorneys

UNITED STATES PATENT OFFICE.

FRANK BUSHEY, OF MUNISING, MICHIGAN.

NUT-LOCK.

951,414.

Specification of Letters Patent. Patented Mar. 8, 1910.

Application filed May 25, 1909. Serial No. 498,236.

*To all whom it may concern:*

Be it known that I, FRANK BUSHEY, a citizen of the United States, residing at Munising, in the county of Alger and State of Michigan, have invented certain new and useful Improvements in Nut-Locks; and I do declare the following to be a full, clear, and exact description of the invention, such as will enable others skilled in the art to which it appertains to make and use the same.

My invention relates to nut locks.

The object of the invention is to provide a cheap, efficient and readily operable nut lock.

Heretofore, many of the nut locks on the market were locked in position upon the nuts or bolts and could not be disengaged therefrom, and it was necessary to break the nut off of the bolt or to destroy the threads thereof in order to release the bolt from engagement with the parts it secured. If this was not the case, then usually, the nut lock had to be destroyed or so mutilated that it could not be utilized again with effectiveness.

It is the object of my invention to avoid these difficulties and broadly speaking, consists in providing a nut lock for machinery of all types which may be readily disengaged from its locking position so that the bolt may be removed for repairs to the machinery or for any other cause.

A still further object of the invention is the provision of a nut lock which will permit the bolt to be turned up into locking position while the locking device is in engagement with the bolt but which will not permit the unscrewing of the bolt or nut.

With these and other objects in view, the invention consists of certain novel features of construction, combination and arrangement of parts as will be more fully described and particularly pointed out in the appended claims.

In the accompanying drawings, Figure 1 is a side elevation with parts broken away; Fig. 2 is a top plan view showing the pawl in retracted position; Fig. 3 is a similar view with parts broken away, showing the pawl in locking position; Fig. 4 is a transverse sectional view on the line 4—4 of Fig. 3; Fig. 5 is a transverse sectional view on the line 5—5 of Fig. 3; Fig. 6 is a detail perspective view of the pawl removed from the nut; and Fig. 7 is a detail perspective view of the tool used for operating the pawl.

Referring more especially to the drawings, 1 represents a bolt of the ordinary character having a head 2, and a threaded end 3, upon which the clamping nut 4, is adapted to be secured. In this instance, the nut employed is cut away to form a table or shoulder 5, extending up from which, at one corner of the nut, is a pivotal bolt or pin 6, upon which is pivoted a suitable pawl or locking dog having a projecting tooth 8, threaded to correspond with the threads of the nut. The tooth is beveled on one face thereof as at 9, to form a stop which is adapted to engage a shoulder 10, upon the nut, to limit the inward movement of the pawl. The opposite side of the tooth is directly transverse to the bolt opening through the nut, and thereby forms a cutting edge upon the threads of the tooth. Adjacent the tooth, there is formed a spring receiving notch 11, adapted to receive the operating end of a heavy leaf spring 12, which is secured in a slot 13, formed vertically in the nut and which is provided with an offset adapted to receive the headed end 14, of the spring. As shown in Fig. 5, the spring is beveled on its top edges and the metal of the nut is upset over the beveled portion so as to hold the spring from vertical movement in the slot, the headed end preventing any longitudinal movement. The spring normally forces the threaded tooth 8, of the dog into engagement with the threads of the bolt and in order to hold the tooth out of engagement therewith, I provide an extension finger 15, on the dog 7, and having pivoted in its bifurcated end a locking pawl 16, which is adapted to engage the walls of a socket 17, sunk into the table 5.

In Fig. 7, I have shown a tool 18, with a bifurcated end 19, the legs of which are shouldered at 20, to engage over the pawl 16, so that it may be forced downwardly into the socket 17. If it is desired to release the dog from engagement with the bolt, the finger 15 and pawl 16, are engaged by the lever 18, and the dog forced over against the tension of the spring, and the pawl 16, thrown into engagement with the socket so as to lock the dog in inoperative position.

It will be noticed that when the dog is in locking position, the bolt may be turned so as to be screwed into the nut but it may not be turned so as to unscrew it from the nut, owing to the fact that the points on the tooth 8, bite into the threads on the bolt and make the pressure exerted thereon in a direct line with the pivot bolt 6.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:—

1. In a device of the class described, a bolt, a nut carried thereon, a table formed on the nut, a pawl pivoted on the table and having toothed engaging points, means for normally throwing said points into engagement with the bolt, means to limit the movement of said pawl in one direction, said nut having a socket formed therein, and means pivoted on the pawl for engaging the socket to lock the teeth out of engagement with the bolt.

2. In a device of the class described, a bolt, a nut threaded thereon, a table formed on said nut, a pawl pivoted to move over said table, teeth formed on said pawl extending diagonally toward the bolt from the longitudinal line of said pawl, said table having a socket formed therein, and a member pivotally mounted on the pawl for engaging the socket to hold the pawl out of engagement with the bolt.

3. In a device of the class described, a bolt, a nut threaded thereon, a table formed on the bolt, a dog pivoted to move over the table, a finger on the dog having a bifurcated end, a pawl pivoted in the bifurcated end of the finger adapted to engage a socket to lock the dog in inoperative position, a spring carried by the nut and adapted to engage the dog for normally throwing the same to operative position, and a tooth extending diagonally from the major axis of said finger and having points formed thereon adapted to engage the threads of the bolt at an angle thereto, whereby the bolt may be turned to screw into the nut but may not be turned to unscrew from the nut.

In testimony whereof I have hereunto set my hand in presence of two subscribing witnesses.

FRANK X BUSHEY.
his / mark

Witnesses:
HENRY B. FREEMAN,
BESSIE VENDIEN.